United States Patent
Wesenberg et al.

(10) Patent No.: US 12,346,594 B2
(45) Date of Patent: *Jul. 1, 2025

(54) BACKGROUND MEMORY SCAN BLOCK SELECTION

(71) Applicant: Micron Technology, Inc., Boise, ID (US)

(72) Inventors: Alex J. Wesenberg, Erie, CO (US); Johnny A. Lam, Firestone, CO (US); Michael Winterfeld, Firestone, CO (US)

(73) Assignee: MICRON TECHNOLOGY, INC., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/504,898

(22) Filed: Nov. 8, 2023

(65) Prior Publication Data

US 2024/0078033 A1 Mar. 7, 2024

Related U.S. Application Data

(63) Continuation of application No. 17/123,914, filed on Dec. 16, 2020, now Pat. No. 11,868,643.

(51) Int. Cl.
*G06F 3/06* (2006.01)
*G06F 13/28* (2006.01)

(52) U.S. Cl.
CPC .......... *G06F 3/0653* (2013.01); *G06F 3/0608* (2013.01); *G06F 3/064* (2013.01); *G06F 3/0679* (2013.01); *G06F 13/28* (2013.01)

(58) Field of Classification Search
CPC ...... G06F 3/0653; G06F 3/0608; G06F 3/064; G06F 3/0679; G06F 13/28; G06F 3/0644; G11C 16/0483; G11C 16/26
See application file for complete search history.

(56) References Cited

U.S. PATENT DOCUMENTS

| | | | |
|---|---|---|---|
| 11,231,987 B1 * | 1/2022 | Bose | G06F 11/327 |
| 2008/0077762 A1 | 3/2008 | Scott et al. | |
| 2012/0081766 A1 | 4/2012 | Mori | |
| 2016/0321172 A1 * | 11/2016 | Jinzenji | G06F 12/0246 |
| 2020/0057562 A1 * | 2/2020 | Lee | G06F 3/0608 |
| 2020/0387447 A1 * | 12/2020 | Byun | G06N 5/04 |
| 2021/0109862 A1 * | 4/2021 | Yang | G06F 13/1668 |
| 2021/0165576 A1 * | 6/2021 | Koch | G06F 3/0644 |
| 2021/0182166 A1 * | 6/2021 | Hahn | G06F 11/3034 |

* cited by examiner

*Primary Examiner* — Kenneth M Lo
*Assistant Examiner* — Jonah C Krieger
(74) *Attorney, Agent, or Firm* — Lowenstein Sandler LLP

(57) ABSTRACT

The memory sub-systems of the present disclosure selects, for memory scans, a memory block which has a highest page fill ratio. In one embodiment, the memory sub-system identifies a number of block stripes located on a logical unit (LU) identified by a logical unit number (LUN), where the LU is one of a plurality of LUs of a memory device. The sub-system determines a fill ratio for each of the plurality of block stripes. The sub-system selects, among the block stripes, a block stripe with a highest fill ratio. The sub-system identifies, from the selected block stripe, a memory block of the LU. The sub-system performs a memory scan operation on the memory block of the memory device.

20 Claims, 9 Drawing Sheets

| Fill Threshold Index | Coupled NAND Page Threshold |
|---|---|
| 0 | 0 |
| 1 | 187 |
| 2 | 475 |
| 3 | 871 |
| ⋮ | ⋮ |

BACKGROUND MEMORY SCAN BLOCK SELECTION

REFERENCE TO RELATED APPLICATION(S)

This application is a continuation of U.S. patent application Ser. No. 17/123,914 filed on Dec. 16, 2020, which is incorporated herein by reference.

TECHNICAL FIELD

Embodiments of the disclosure relate generally to memory sub-systems, and more specifically, relate to block selection for background memory scans.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 4 is a block diagram that illustrates an example of a coupled NAND page threshold table according to an embodiment.

DETAILED DESCRIPTION

Figure 1A:
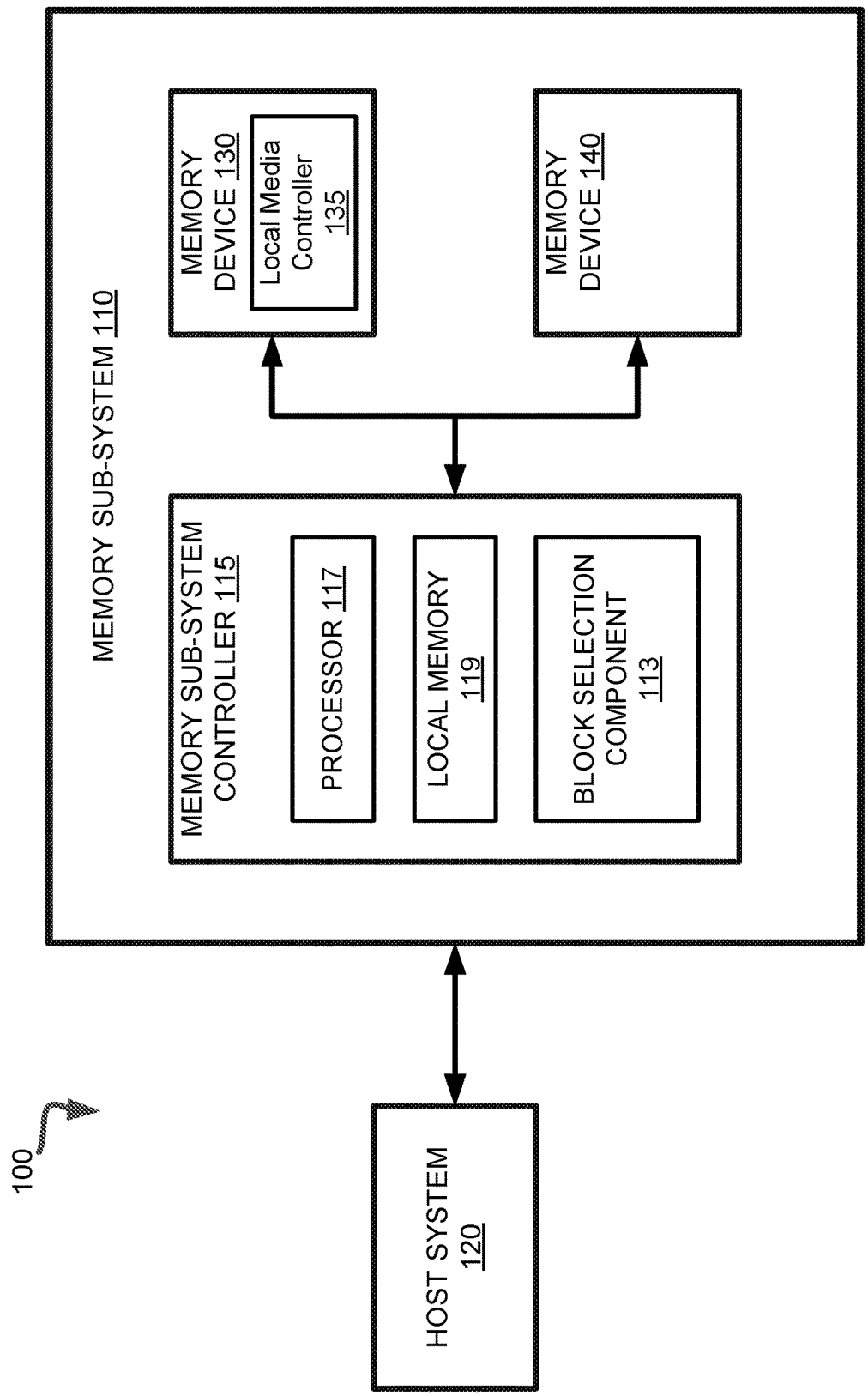
FIG. 1A illustrates an example computing system that includes a memory sub-system according to some embodiments.

Aspects of the present disclosure are directed to selection of a block for memory scans on a non-volatile memory device of a memory sub-system supporting zoned namespaces. The memory sub-system can be a storage device, a memory module, or a combination of a storage device and memory module. Examples of storage devices and memory modules are described below in conjunction with FIG. 1A. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a negative-and (NAND) memory device. Other examples of non-volatile memory devices are described below in conjunction with FIG. 1A. A non-volatile memory device is a package of one or more dies (or logical units (LUs) identified by logical unit numbers (LUNs)). Each LU can consist of one or more planes. For some types of non-volatile memory devices (e.g., NAND devices), each plane consists of a set of physical blocks. Each block consists of a set of pages. Each page consists of a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

A memory device can include multiple memory cells arranged in a two-dimensional grid. Memory cells are etched onto a silicon wafer in an array of columns (also hereinafter referred to as bitlines) and rows (also hereinafter referred to as wordlines). A wordline can refer to one or more rows of memory cells of a memory device that are used with one or more bitlines to generate the address of each of the memory cells. The intersection of a bitline and wordline constitutes the address of the memory cell. A block hereinafter refers to a unit of the memory device used to store data and can include a group of memory cells, a wordline group, a wordline, or individual memory cells. One or more blocks can be grouped together to form a plane of the memory device in order to allow concurrent operations to take place on each plane. The memory device can include circuitry that performs concurrent memory page accesses of two or more memory planes. For example, the memory device can include a respective access line driver circuit and power circuit for each plane of the memory device to facilitate concurrent access of pages of two or more memory planes, including different page types.

The cells (or simply "media") of memory devices can be organized hierarchically from LU (upper level), to plane, to block, to page (lower level). A block set (also referred to as a block stripe) can be a set of blocks arranged across planes of different LUs, such that the blocks are grouped together for purposes of data storage. Writing to block sets allows more host data that can be concurrently written and read at the same time across multiple LUs.

For some types of non-volatile memory devices (e.g., NAND devices), background scans are an integral part of proper NAND flash operation. A scan may refer to an examination of programmed bits in the NAND device. The background scan operations are used to maintain health and performance of the NAND devices by monitoring bit error rates for programmed data in the NAND devices over the entire lifecycle of NAND devices. Background scans can rely on a scan for both fully and partially programmed blocks on the NAND device. In a non-volatile memory device (or solid state device (SSD)), block stripes can span all physical logical units (LUs) and are filled sequentially and in a predictable physical order using a Logical to Physical (L2P) mapping scheme to map logical host block addresses (LBAs) to physical NAND addresses. Because of such a L2P mapping in a traditional SSD, there is some minimum number of partially filled blocks and block stripes in each LU. Due to these system design considerations, an SSD written to a certain capacity would have a representative sample of blocks on each LU in the device that could be used to perform the desired background scans. In a Zoned Namespaces (ZNS) SSD, there is no L2P mapping in the traditional sense, and each host zone can be mapped to a block stripe within the flash translation layer (FTL) on the first host write to that zone. A zone may be referred to as a data group, and may be referenced as a range in the LBA space. A "data group" can include one or more blocks within a block set, or can include one or more block sets across multiple LUs. LBAs of a zone (e.g., logical address space associated with a data group) can be sequentially ordered within the LBA space and be mapped to sequentially ordered physical addresses within the physical address space. Writes within a zone are performed by a zone write pointer, sequentially starting from the beginning of the zone and data within a zone cannot be arbitrarily overwritten. The only way to overwrite an already written zone is to reset the zone write pointer, effectively deleting all the data in the zone, and to restart writing from the beginning of the zone. The ZNS SSD can report a Zone Active Limit (ZAL) which indicates to the host the maximum time that a zone can remain open. The Zone Active Limit bounds the amount of time the host can leave a zone partially filled. However, even though the zone may appear be reported as finished to the host, the corresponding NAND blocks may not be fully programmed, adding complexity to NAND background scan operations. In addition, zone sizes in ZNS can be much smaller than a block stripe in a typical SSD, resulting in a larger number of block stripes in a ZNS SSD.

The memory sub-systems of the present disclosure address the above and other deficiencies by selecting, for memory scans, a candidate memory block which has a highest page fill ratio. In one embodiment, the memory sub-system identifies a number of block stripes located on a logical unit (LU) identified by a logical unit number (LUN), where the LU is one of a plurality of LUs of a memory device. The sub-system determines a fill ratio for each of the plurality of block stripes. The sub-system selects, among the block stripes, a block stripe with a highest fill ratio. The sub-system identifies, from the selected block stripe, a memory block of the LU. The sub-system performs a memory scan operation on the memory block of the memory device.

Various aspects of the above referenced methods and systems are described in details herein below by way of examples, rather than by way of limitation.

FIG. 1A illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1A illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1A illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a negative-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1A has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical MU address, physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

The memory sub-system 110 includes a block selection component 113 that can select a block candidate which has the highest page fill percentage/ratio for memory scans in a zoned namespaces SSD. In some embodiments, the memory sub-system controller 115 includes at least a portion of the block selection component 113. In some embodiments, the block selection component 113 is part of the host system 110, an application, or an operating system. In other embodiments, local media controller 135 includes at least a portion of block selection component 113 and is configured to perform the functionality described herein. Further details with regards to the operations of the block selection component 113 are described below.

Figure 1B:
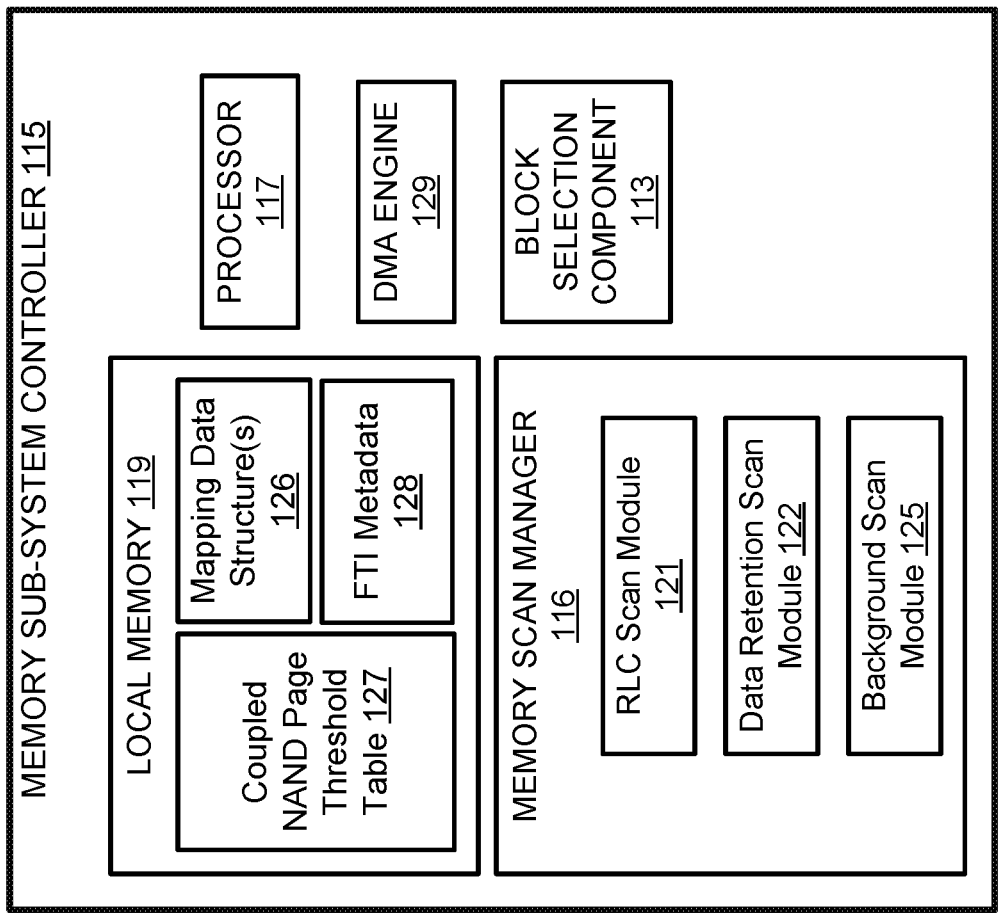
FIG. 1B illustrate an example memory sub-system controller according to one embodiment.

Referring to FIG. 1B, in one embodiment, memory sub-system controller 115 can include memory scan manager 116 and direct memory access (DMA) engine 129. DMA engine 129 may be a hardware-based component of the memory sub-system that is configured to perform DMA commands, and direct memory transfers from a source memory region to a destination memory region. Memory scan manager 116 can include read level calibration (RLC) scan module 121, data retention scan module 122, and background scan module 125. Memory scan manager 116 can send a request with a LUN to block selection component 113 to request for a block in a LU identified by the LUN. Memory scan manager 116 can then perform various memory scans, including a read level calibration scan, a data retention scan, or a background scan (for error bits) on the identified block for the LUN.

The read level calibration scan can be a memory scan that determines read level thresholds (voltage level thresholds for read operations) for a memory device. The read level thresholds can be used for a continuous read level calibration, which adjusts the one or more read level thresholds used for reading pages from the memory device. The read level calibration operation can be performed to keep each threshold centered so that the memory component can achieve the best overall bit error rate (BER) possible. It is referred to as continuous because the algorithm samples continually at discrete intervals.

Data retention scans refer to scanning a number of blocks/LUNs at power on to monitor data retention after the nonvolatile memory devices have been powered off for a potentially long/extended period of time. To avoid the use of potentially corrupted data, controller 115 may perform a data retention scan to the nonvolatile memory devices at power on to assess the condition of the data.

Background scan can monitor bit error rates for programmed data in a NAND device over the entire lifecycle of the NAND device. Background scans can rely on a scan for both fully and partially programmed blocks on the NAND device.

Local memory 119 can include mapping data structures 126, coupled NAND page threshold table 127, and filled threshold index (FTI) metadata 128. Mapping data structures 126 can include various mappings for block sets as further described in FIG. 3. Coupled NAND page threshold table 127 can include a mapping for FTI to coupled NAND page thresholds. FTI metadata 128 can include metadata that stores the FTI value for each block stripe grouped by the LUNs in the memory sub-system 110. The FTI value is an index value (natural number) that indicates a fill ratio of a block stripe. The fill ratio is associated with a ratio or percentage of pages in the block stripe that has valid data. The coupled NAND page threshold for a FTI value refers to a minimum number of pages that are fully coupled in a block stripe, for the block stripe to be associated with a corresponding FTI value.

A page is fully coupled if the page can be read without inducing read disturb due to nearby pages not being programmed. I.e., if a page is programmed, it is not reliable to be used to determine a bit error rate if a subsequent page is not programmed. Read disturb refers to reading from a memory cell that can cause some nearby memory cells in the same memory block to change over time. In one embodiment, due to read disturb errors, only fully coupled pages are used to tally a count for the fill ratio. To reduce a complexity, coupled NAND page threshold table 127 is used to approximate the fully coupled pages from a write cursor for the block set.

Block selection component 113 can receive a request to identify a block candidate within a logical unit (LU) that is identified by a LUN value, the request containing the LUN value. Block selection component 113 can query the FTI metadata 128 for a block stripe of the LUN, where the block stripe is associated with a highest FTI value. Component 113 then maps, based on mapping data structures 126, the block stripe to a block within the LUN. Block selection component 113 may then return an identifier for the block, In another embodiment, Block selection component 113 may also determine the last programmed page for the block, which can be tracked by local memory 119, and return an identifier for the last programmed page for the block.

Figure 2:
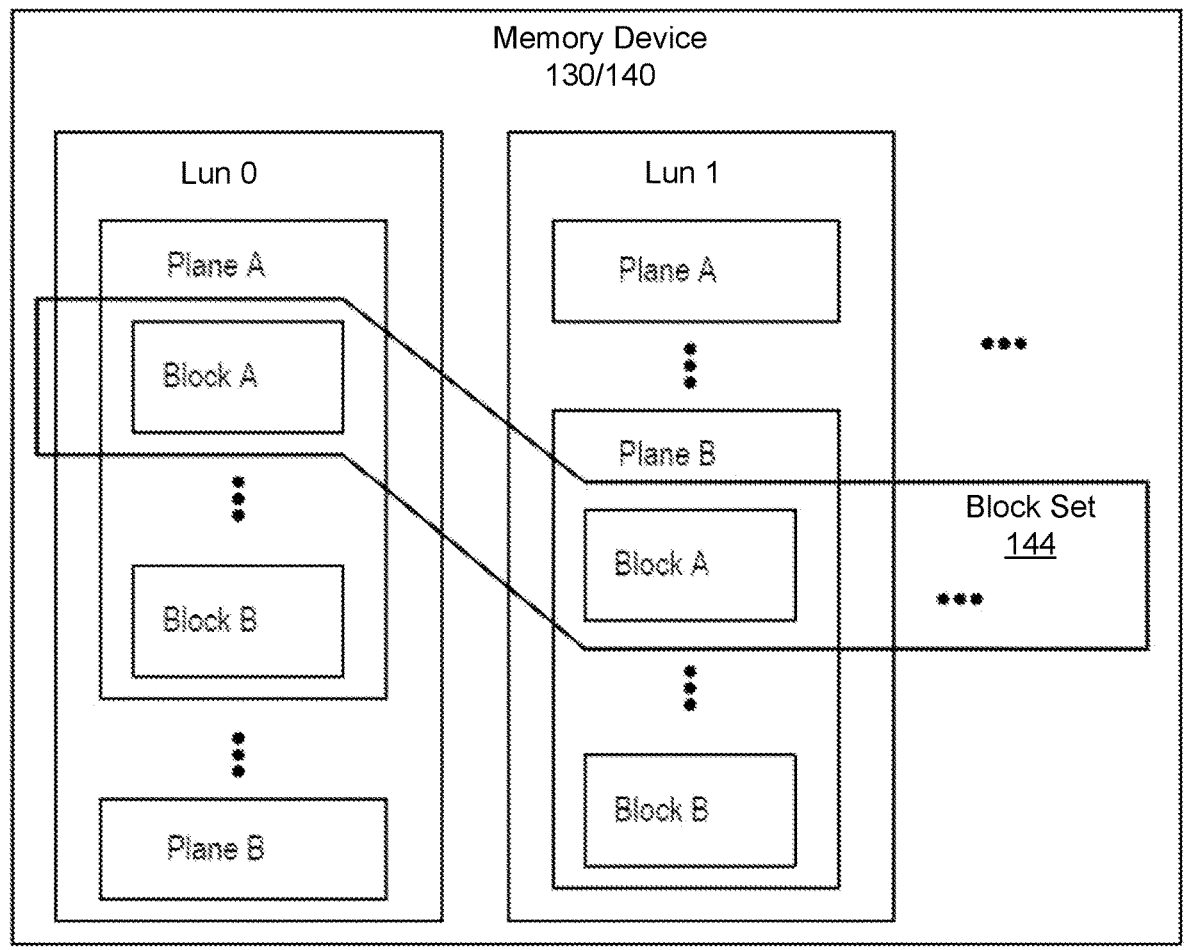
FIG. 2 is a block diagram that illustrates a block set (block stripe) allocated across IC logical units (LUNs) according to an embodiment.

FIG. 2 is a block diagram that illustrates a block set (block stripe) allocated across logical units according to an embodiment. Referring to FIG. 2, with reference to one or more memory device(s) 130, 140, the physical address space of LUs identified by the LUNs (e.g., LUN 0 and LUN 1) within memory devices 130, 140 can be hierarchically organized by plane, block, and page. So, for example, each LU of LUN 0 and LUN 1 can include Plane A and Plane B, and each of Plane A and Plane B can include Block A and Block B. A block set (or block stripe) can be defined as a group of blocks arrayed across planes of multiple dies of the memory device(s). As illustrated, a block set 144 is arrayed to include Block A of Plane A of LUN 0, Block A of Plane B of LU identified by LUN 1, and so forth, e.g., also of Plane C of LU identified by LUN 1 and on to further LUNs, if present and online.

Figure 3:
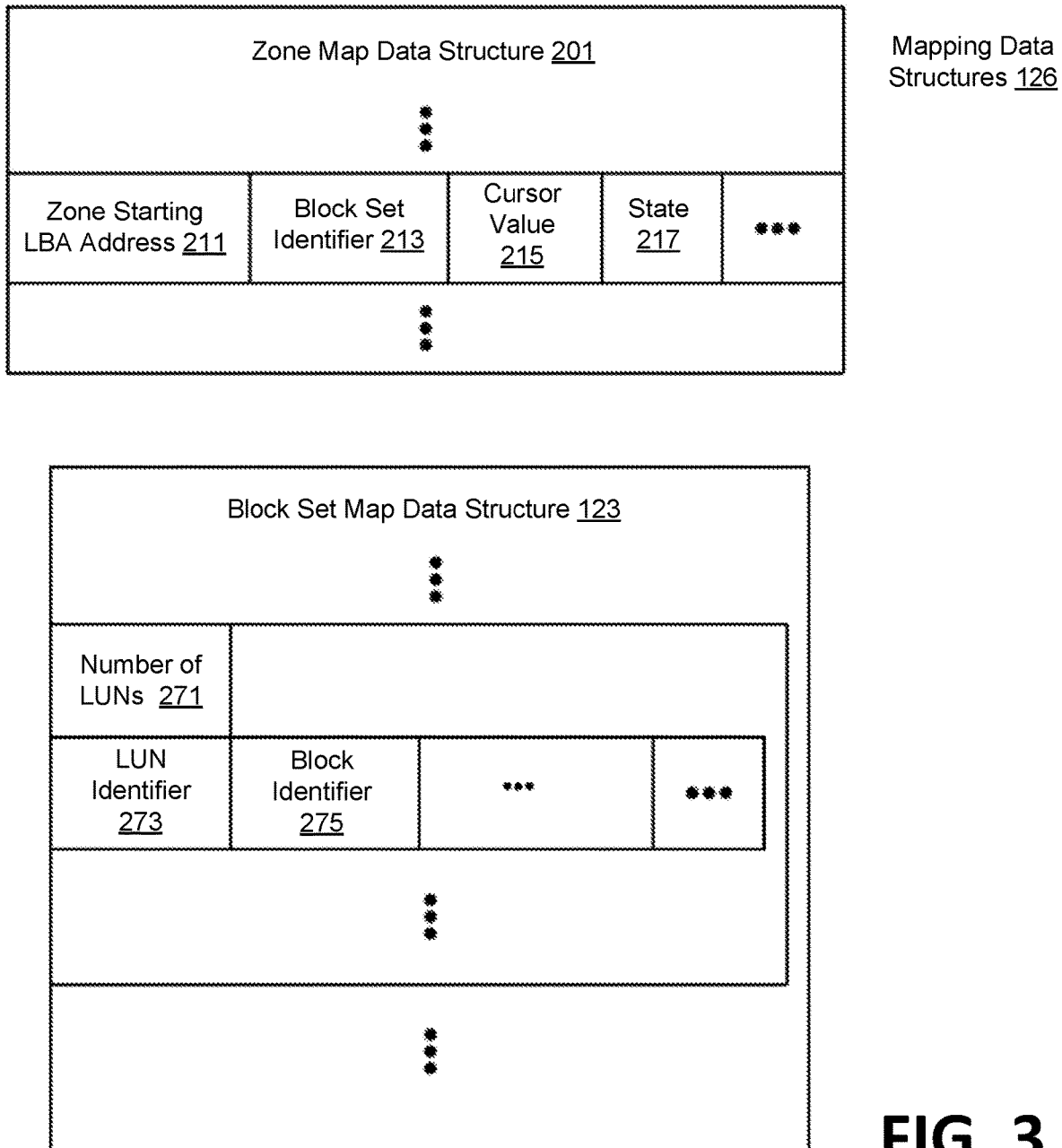
FIG. 3 is a block diagram that illustrates an example of data structures configured to support zone-based mapping according to an embodiment.

FIG. 3 is a block diagram that illustrates an example of data structures configured to support zone-based mapping according to an embodiment. Controller 115 can store some of mapping data structures 126 in volatile local memory 119, and/or in non-volatile memory devices 130-140 (not shown) of FIG. 1A. The controller 115 can also support the media layout (e.g., map where a zone is to be located within physical address space) using the data structures of FIG. 3.

In FIG. 3, a zone map data structure 201 is configured to provide media layout information for a zone in a namespace, e.g., the LBA space for ZNS operations. The zone map data structure 201 can have multiple entries. Each zone map entry in the zone map data structure 201 identifies information about a zone, such as a starting LBA address 211 of the zone, a block set identifier 213 of the zone, a zone cursor value 215 of the zone, a state 217 of the zone, and the like. The zone map data structure 201 contains information about a zone and can be used to identify a physical location of the zone, e.g., which block stripe/LUN a zone is located in the physical address space.

The host system 120 can write data in the zone beginning at the LBA of the zone starting LBA address 211. The host system 120 can write data in the zone sequentially in the LBA space. After an amount of data has been written into the zone, the current starting LBA address for writing subsequent data is identified by the zone cursor value 215. Each write command for the zone moves the zone cursor value 215 to a new starting LBA address for the next write command for the zone. The state 217 can have a value indicating that the zone is empty, full, implicitly open, explicitly open, closed, and the like, to track progress of writing that zone.

Referring to FIG. 3, block set map data structure 123 stores data controlling aspects of the dynamic media layout for a zone. The block set map data structure 123, which can be a table in one embodiment, can have multiple entries. Each block set entry in the block set data structure 123 identifies a number/count 271 of LUs (e.g., LUN 0, LUN 1, etc.) in which data of the zone is stored. For each of the LUs used for the zone, the block set entry of the block set map data structure 123 has a LUN identifier 273, a block identifier 275, and the like. A memory sub-system can use the block set map data structure 123 to identify a block corresponding to a block stripe within a given LU.

The LUN identifier 273 identifies a specific LU (e.g., LUN 0, LUN 1, etc.) in the media of the memory sub-system 110, on which data of the zone can be stored. The block identifier 275 identifies a specific block of memory (e.g., NAND flash memory or other media) within the LU that is identified using the LUN identifier 273, in which the data of the zone can be stored. In one embodiment, block set map data structure 123 is a flat indexed mapping table that is indexed by the block set ID (e.g., block stripe ID). The block set map data structure 123 can map the block set ID to physical blocks (e.g., physical block addresses or identifiers) within each die/LUN of the memory device.

For example, a memory sub-system 110 receives multiple streams of write commands. In an embodiment, each respective stream of the multiple streams is utilized to write data sequentially in a logical address space in one embodiment; and in another embodiment, a stream in the multiple streams is configured to write data pseudo-sequentially, or randomly in a logical address space in one embodiment. Each write stream includes a set of commands that are tagged to write, trim, overwrite a set of data together as a group. In the group, the data can be written in a logical space sequentially, randomly, or pseudo-sequentially. Preferably, the data in the group is written into an erase block set, where memory cells in the erase block set store data for the stream but not data from other streams. The erase block set can be erased to remove the data of the stream without erasing the data of other streams.

For example, each of write streams is permitted to sequentially write at LBAs in a zone in a namespace allocated in the media of the memory device(s) 130, 140 of the memory sub-system 110, but prohibited from writing data out of sequence in the LBA (or logical address) space. Because zones have Zone Active Limit (ZAL) which indicates to the host the maximum time that a zone can remain open, a zone may be closed before data is written to the zone, e.g., leading to partially filled zones. That is, some memory blocks remain empty/invalid even though the zone is indicated to be complete/closed.

A block for background scan purposes can be a NAND block that has a highest page fill ratio. Another consideration for memory scans is that the filled pages of the block should be considered fully coupled to be considered readable for purposes of bit error rate detection via scans. Depending on the NAND type, a page is fully coupled if a memory controller can read the page without inducing read disturb due to the following pages not being programmed. Thus, predetermined coupled NAND page threshold tables can be used to determine a fill ratio of a block stripe.

FIG. 4 is a block diagram that illustrates an example of a coupled NAND page threshold table according to an embodiment. Table 400 may be a coupled NAND page threshold table for a type of NAND device. Table 400 can be used by controller 115 to generate a fill threshold index (FTI) value, which indicates a fill ratio, for a block stripe. The FTI value indicates the fill ratio for a block stripe. The coupled NAND page threshold column indicates the minimum threshold of filled pages that are fully coupled for a corresponding FTI value.

Figure 5:
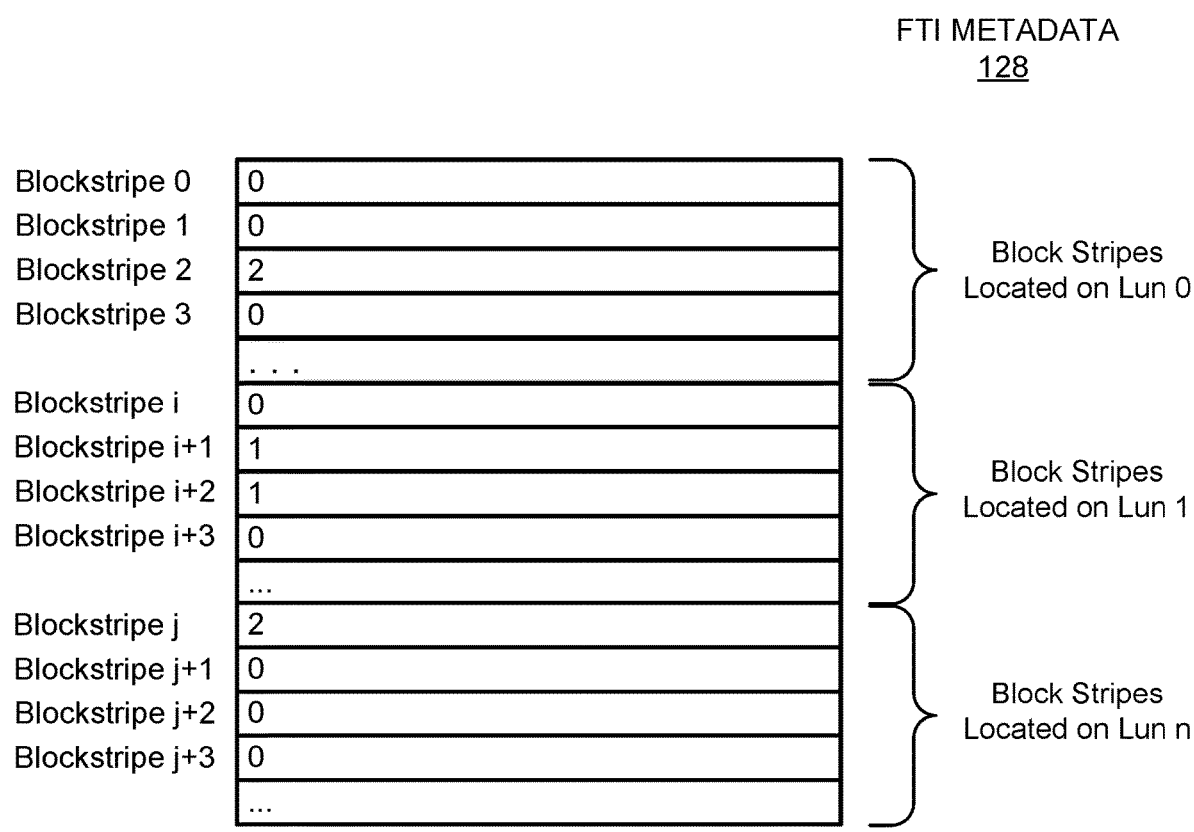
FIG. 5 is an example of a block stripe fill threshold index (FTI) metadata according to an embodiment.

FIG. 5 is an example of a block stripe fill threshold index (FTI) metadata according to an embodiment. In this example, metadata 128 indicates LUN 0 includes block stripes 0, 1, 2, 3, etc.; LUN 1 includes block stripes i, i+1, i+2, i+3, etc.; LUN n includes block stripes j, j+1, j+2, j+3, etc. In one embodiment, metadata 128 can include name/value pairs. In another embodiment, metadata 128 includes a continuous array of FTI values, where the FTI values have predetermined mappings to block stripes based on the position of the FTI value in the metadata. In one embodiment, FTI metadata 128 is an array that is indexed by block set ID (e.g., block stripe ID). Note that the continuous array of FTI value can facilitate the block selection as described further below.

In one embodiment, the FTI values for block stripes in metadata 128 can be initialized to 0. Here, a FTI value can be an index value (e.g., 0, 1, 2, 3, 4, etc.) that is mapped to a coupled NAND page threshold. In one embodiment, a memory controller updates the entries in metadata 128 when a page is written (programmed) to a block stripe associated with a zone. Specifically, when a write request is made to program a block stripe (in this case, block stripe n), a current FTI value of block stripe n can be retrieved from metadata 128. The current FTI value can be used to look up a next FTI value, and a coupled NAND page threshold for the next FTI value (e.g., next coupled NAND page threshold). The next coupled NAND page threshold can then be compared against a page number of the current page being programmed, and if the page number matches or exceeds the next coupled NAND page threshold, the FTI value for the block stripe is updated as the next FTI value, e.g., 0→1.

For example, referring to FIGS. 1A, 4-5, given a block stripe n has a FTI value of 0. When a write is made to a zone, via a cursor value, the zone may be mapped to a page value and a block stripe value, e.g., page 187 of block stripe n. Controller 115 may retrieve a FTI value of 0 from metadata 128 corresponding to block stripe n. Controller 115 looks up a next FTI value from table 400 after the FTI value of 0, which is 1. Controller 115 retrieves the next coupled NAND page threshold value, e.g., 187, from table 400. Controller 115 compares the current page being programmed to the next coupled NAND page threshold value, e.g., the current page of 187 is greater than or equal to the next coupled NAND page threshold value of 187. Responsive to determining that the page number of the current page being programmed is greater than or equal to the next coupled NAND page threshold value, controller 115 updates the FTI value in metadata 128 for block stripe n to be the next FTI value, e.g., 1.

In one embodiment, to identify a block stripe with the highest page fill in a LU identified by a LUN, block selection module 113 can iterate through the metadata 128 for the particular LUN to identify the block stripe that has the highest FTI value as the block stripe with the highest page fill. After the block stripe is identified, block selection module 113 can query block set map data structure 123 determine the block candidate based on the block stripe and the LUN.

In one embodiment, metadata 128 is grouped by the LU identified by the LUNs so that each LUN corresponds to a continuous segment of metadata 128. For example, scan manager 116 can request block selection component 113 to return an identifier for a block candidate to perform a memory scan on LUN 0. In one embodiment, block selection component 113 can identify the block stripes (or block sets) from block set map data structure 123 for block sets that are associated with LUN 0. Block selection component 113 can then traverse or scan metadata 128 for the block stripes associated with LUN 0 to retrieve the FTI values for the block stripes. Block selection component 113 compares the FTI values to determine a block stripe with a highest FTI value. BSM translates the block stripe to a block based on block set map data structure 123 and obtain an identifier for the block. In one embodiment, block selection component 113 can retrieve a last programmed page for the block, which can be tracked by local memory 119. Block selection component 113 returns the block identifier and/or the last programmed page to scan manager 116.

In another example, block selection component 113 can send a request to a DMA engine, such as DMA engine 129 of FIG. 1B to perform the search of a highest FTI value in metadata 128. In one embodiment, metadata 128 includes an array of FTI values, indexed by block stripe #, and grouped by LUNs. With metadata 128 in an array, metadata 128 can be bade onto memory and DMA engine 129 can accelerate the search (without blocking the controller for processing other tasks) for the block stripe by using a min/max/compare function to iterate through memory entries corresponding to the metadata 128 for a LU (e.g., LUN 0) to identified a memory address with the highest FTI value.

In one embodiment, block selection component 113 identifies a block stripe using the identified memory address. For example, block selection component 113 can calculate an offset value for the identified memory address from a starting address in the range of memory addresses, and calculate a block stripe # using the offset value. For example, if the starting address 0x00 corresponds to block stripe (BS) 0, and a BS increments by 0x04, then the memory address 0x04 (offset=0x04) corresponds to BS 1, the memory address 0x08 (offset=0x08) corresponds to BS 2, and so forth. When the identified memory address is mapped to a block stripe #, DMA engine can notify block selection component 113 of the block stripe #. Block selection component 113 then translate the block stripe # to a block # based on block set map data structure 123 and obtain an identifier for the block as described above.

Figure 6:
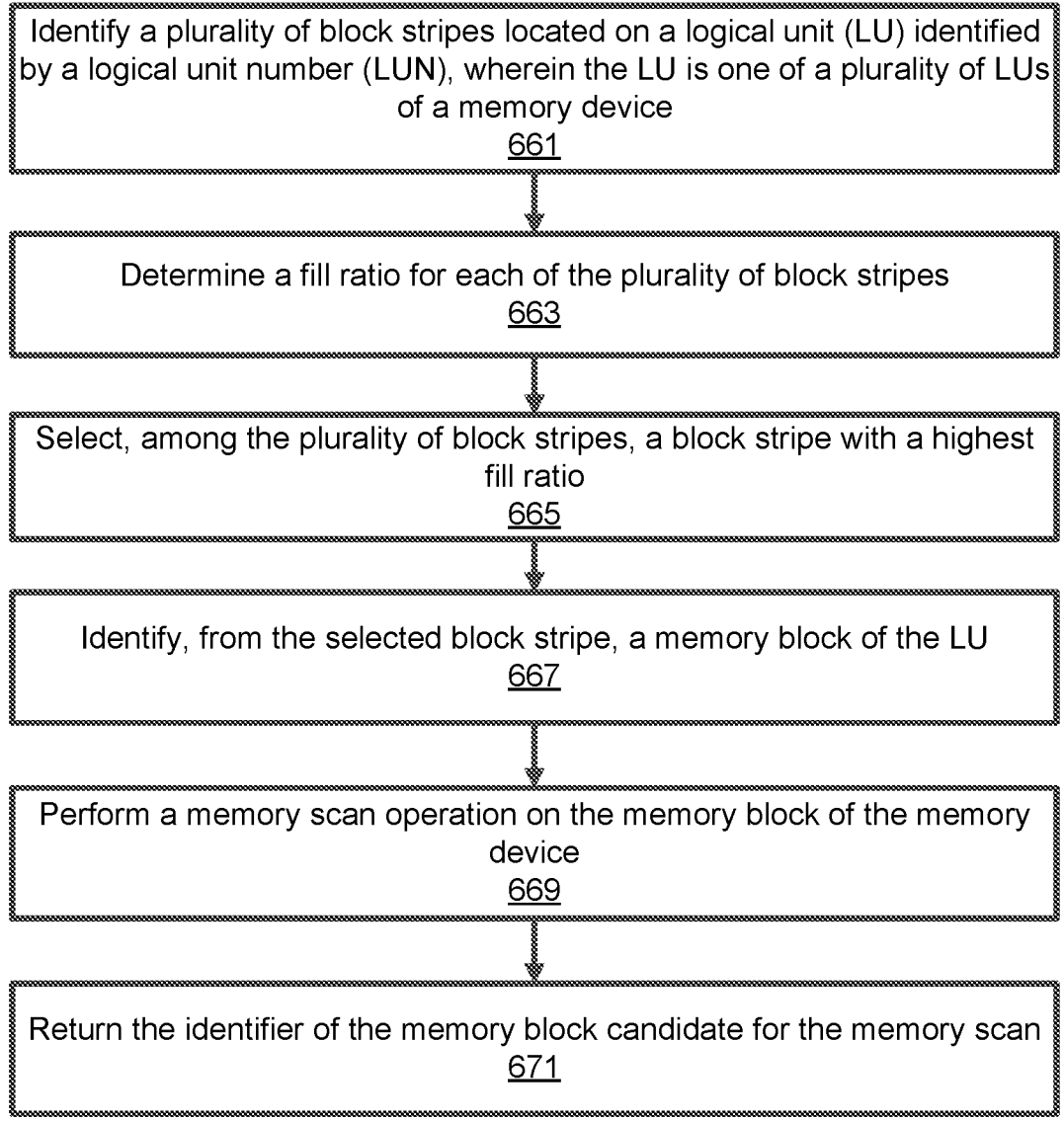
FIG. 6 is a flow diagram of an example method to select a memory block for a memory scan according to an embodiment.

FIG. 6 is a flow diagram of an example method 660 to select a memory block for memory scans in a zoned namespaces SSD, in accordance with some embodiments of the present disclosure. Method 660 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 660 is performed by the block selection component 113 of FIG. 1B. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 661, processing logic identifies those block stripes that are located on a logical unit (LU) identified by a logical unit number (LUN), where the LU is one of a number of LUs within a memory device. The block stripes can be retrieved from block set mapping data structure 123 because block set mapping data structure 123 contains a mapping for all the block stripes in the LU. At operation 663, processing logic determines a fill ratio for each of the plurality of block stripes. At operation 665, processing logic selects, among the plurality of block stripes, a block stripe with a highest fill ratio. At operation 667, processing logic identifies, from the selected block stripe, a memory block of the LU. The memory block candidate can be identified by retrieving a first block entry associated with the LUN for the block stripe from block set mapping data structure 123. At operation 669, processing logic performs a memory scan operation on the memory block of the memory device.

In one embodiment, determining the fill ratio for a block stripe comprises determining a fill threshold index (FTI) metadata of the block stripe. In one embodiment, the FTI metadata of the block stripe is indexed incrementally corresponding to the plurality of block stripes of a same LU.

In one embodiment, determining the fill threshold index (FTI) metadata of the block stripe comprises determining the fill threshold index (FTI) metadata of the block stripe via a direct memory access (DMA) engine. In one embodiment, processing logic further updates the FTI metadata of the block stripe in response to a page write to the block stripe by: determining a page number for the page write; determining, using a coupled NAND page threshold table, a FTI value based on the page number; and updating the FTI metadata according to the FTI value.

In one embodiment, the memory device is a non-volatile memory device with zoned namespaces. In one embodiment, the memory scan comprise at least one of a read level calibration memory scan, a data retention memory scan, or a background memory scan to detect bit errors.

Figure 7:
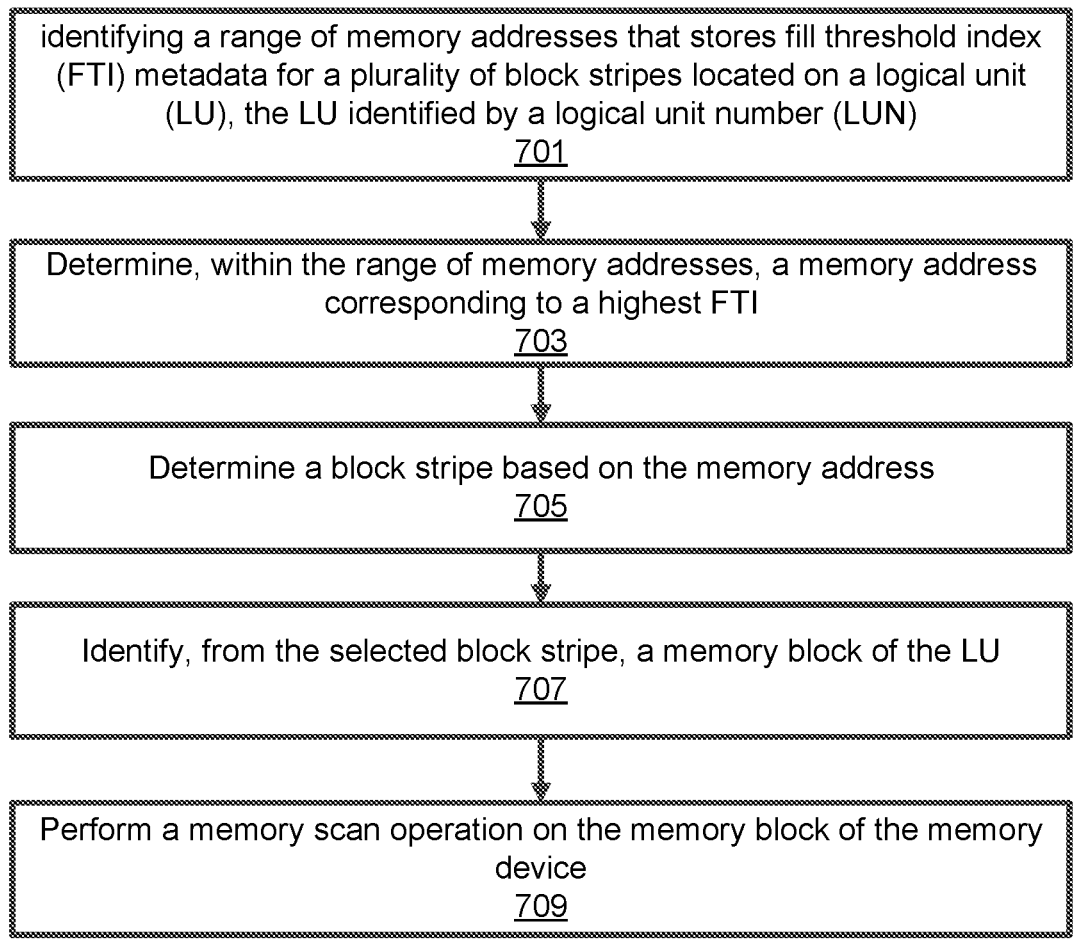
FIG. 7 is a flow diagram of an example method to select a memory block for a memory scan according to an embodiment.

FIG. 7 is a flow diagram of an example method 700 to select a memory block for memory scans in a zoned namespaces SSD, in accordance with some embodiments of the present disclosure. Method 700 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 700 is performed by the block selection component 113 of FIG. 1B. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 701, processing logic identifies a range of memory addresses that stores fill threshold index (FTI) metadata for a plurality of block stripes located on a logical unit (LU), the LU identified by a logical unit number (LUN). At operation 703, processing logic determines, within the range of memory addresses, a memory address corresponding to a highest FTI. At operation 705, processing logic determines a block stripe based on the memory address. At operation 707, processing logic identifies, from the block stripe, a memory block of the LU. At operation 709, processing logic performs a memory scan operation on the memory block of the memory device.

In one embodiment, determining a block stripe based on the memory address comprises determining, based on the memory address, an offset value from a starting position in the range of memory addresses, and determining the block stripe based on the offset value. In one embodiment, the FTI metadata of the block stripe is indexed incrementally corresponding to the plurality of block stripes of a same LU.

In one embodiment, determining, within the range of memory addresses, a memory address corresponding to a highest FTI comprises determining, within the range of memory addresses, a memory address corresponding to a highest FTI via a direct memory access (DMA) engine. In one embodiment, processing logic further updates the FTI metadata of the block stripe in response to a page write to the block stripe by: determining a page number for the page write; determining, using a coupled NAND page threshold table, a FTI value based on the page number; and updating the FTI metadata according to the FTI value.

In one embodiment, the memory device is a non-volatile memory device with zoned namespaces. In one embodiment, the memory scan comprise at least one of a read level calibration memory scan, a data retention memory scan, or a background memory scan to detect bit errors.

Figure 8:
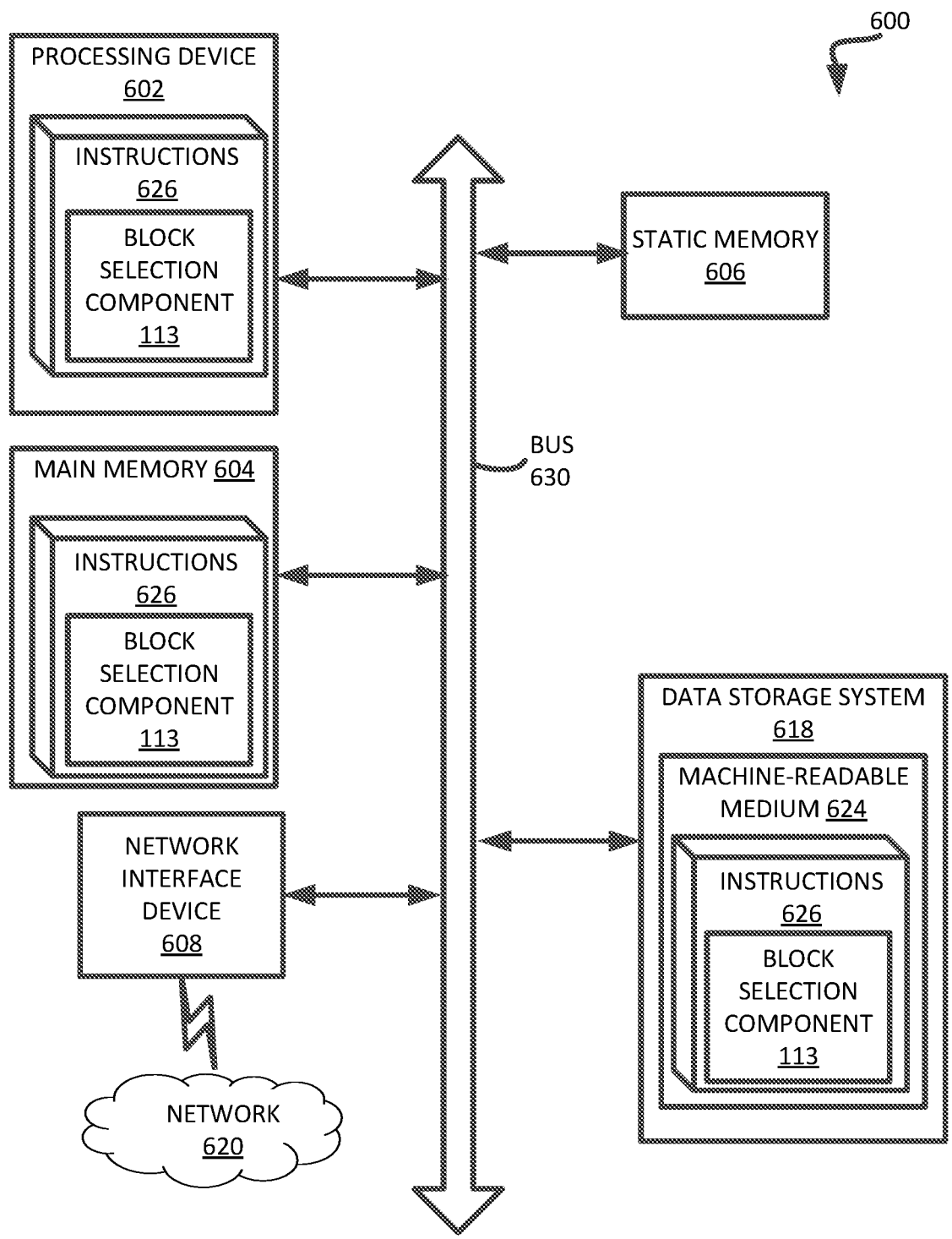
FIG. 8 is a block diagram of an example computer system in which embodiments of the present disclosure may operate.

FIG. 8 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the block selection component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or RDRAM, etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to a block selection component (e.g., the block selection component 113 of FIG. 1B). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
a memory device comprising a plurality of memory dies, each memory die comprising a plurality of memory blocks; and
a processing device, operatively coupled with the memory device, to perform operations comprising:
determining a page fill ratio for each of a plurality of block stripes having at least one block located on a particular memory die, each of the plurality of block stripes comprising at least one memory block from each of a subset of the plurality of memory dies, wherein the page fill ratio is a ratio of pages that can be read without inducing read disturb in a respective block stripe due to nearby pages not being programmed;
selecting, among the plurality of block stripes, a block stripe with a highest page fill ratio; and
performing a memory scan operation on a particular memory block of the selected block stripe located on the particular memory die.

2. The system of claim 1, wherein determining the page fill ratio for each of the plurality of block stripes comprises determining a fill threshold index (FTI) value for each of the plurality of block stripes from FTI metadata, and wherein selecting the block stripe with the highest page fill ratio comprises selecting a block stripe having a highest FTI value.

3. The system of claim 2, further comprising updating a FTI value of a particular block stripe in the FTI metadata by:
determining a page number for a page write;
determining, using a page threshold table, a corresponding FTI value based on the page number; and
updating the FTI value of the particular block stripe in the FTI metadata based on the FTI value determined using the page threshold table.

4. The system of claim 3, wherein FTI values for the plurality of block stripes are stored contiguously in the FTI metadata.

5. The system of claim 4, wherein the FTI value for each of the plurality of block stripes is determined via a direct memory access (DMA) engine.

6. The system of claim 1, wherein the memory device is a non-volatile memory device with zoned namespaces.

7. The system of claim 1, wherein the memory scan operation comprises at least one of a read level calibration scan, a data retention scan, or a bit error scan.

8. A method, comprising:
identifying a range of memory addresses that stores fill threshold index (FTI) metadata comprising FTI values indicating a page fill ratio for each of a plurality of block stripes having at least one block located on a particular memory die of a memory device, wherein the page fill ratio is a ratio of pages that can be read without inducing read disturb in a respective block stripe due to nearby pages not being programmed;
determining, within the range of memory addresses, a memory address corresponding to a highest FTI value;
determining a block stripe based on the memory address;
identifying a memory block from the block stripe; and
performing a memory scan operation on the memory block.

9. The method of claim 8, further comprising updating a FTI value of a particular block stripe in the FTI metadata by:
determining a page number for a page write;
determining, using a page threshold table, a corresponding FTI value based on the page number; and
updating the FTI value of the particular block stripe in the FTI metadata based on the FTI value determined using the page threshold table.

10. The method of claim 8, wherein determining a block stripe based on the memory address comprises:
determining, based on the memory address, an offset value from a starting position in the range of memory addresses; and
determining the block stripe based on the offset value.

11. The method of claim 10, wherein the FTI values for the plurality of block stripes are stored contiguously in the FTI metadata.

12. The method of claim 11, wherein determining, within the range of memory addresses, a memory address corresponding to the highest FTI value comprises determining, within the range of memory addresses, the memory address corresponding to the highest FTI value via a direct memory access (DMA) engine.

13. The method of claim 8, wherein the memory device is a non-volatile memory device with zoned namespaces.

14. The method of claim 8, wherein the memory scan operation comprises at least one of a read level calibration scan, a data retention scan, or a bit error scan.

15. A non-transitory machine-readable storage medium including instructions that, when accessed by a processing device, cause the processing device to execute one or more operations, comprising:
determining a page fill ratio for each of a plurality of block stripes having at least one block located on a particular memory die of a memory device, wherein the page fill ratio is a ratio of pages that can be read without inducing read disturb in a respective block stripe due to nearby pages not being programmed;
selecting, among the plurality of block stripes, a block stripe with a highest page fill ratio; and
performing a memory scan operation on a particular memory block of the selected block stripe located on the particular memory die.

16. The non-transitory machine-readable storage medium of claim 15, wherein determining the page fill ratio for each of the plurality of block stripes comprises determining a fill threshold index (FTI) value for each of the plurality of block stripes from FTI metadata, and wherein selecting the block stripe with the highest page fill ratio comprises selecting a block stripe having a highest FTI value.

17. The non-transitory machine-readable storage medium of claim 16, further comprising instructions that, when accessed by a processing device, cause the processing device to execute one or more operations, comprising:

updating a FTI value of a particular block stripe in the FTI metadata by:
　determining a page number for a page write;
　determining, using a page threshold table, a corresponding FTI value based on the page number; and
　updating the FTI value of the particular block stripe in the FTI metadata based on the FTI value determined using the page threshold table.

18. The non-transitory machine-readable storage medium of claim 16, wherein FTI values for the plurality of block stripes are stored contiguously in the FTI metadata.

19. The non-transitory machine-readable storage medium of claim 18, wherein the FTI value for each of the plurality of block stripes is determined via a direct memory access (DMA) engine.

20. The non-transitory machine-readable storage medium of claim 15, wherein the memory device is a non-volatile memory device with zoned namespaces.

* * * * *